5 Sheets—Sheet 1.

J. R. WILLIAMS
Cigar-Bunching Machine.

No. 214,015. Patented April 8, 1879.

Attest:
Herman Kreitler
Geo. H. Bodenschatz

Inventor.
John R. Williams
per T. S. Crane atty

J. R. WILLIAMS.
Cigar-Bunching Machine.

No. 214,015.   Patented April 8, 1879.

Attest:
Fred K. Day
Ed. C. Roberts

Inventor.
John R. Williams per
Thos. S. Crane, Atty.

5 Sheets—Sheet 4.

J. R. WILLIAMS.
Cigar-Bunching Machine.

No. 214,015. Patented April 8, 1879.

Attest:
Clarence H. Smith
E. P. Roberts

Inventor.
John R. Williams, per
Thos. S. Crane, Atty.

J. R. WILLIAMS.
Cigar-Bunching Machine.

No. 214,015.  Patented April 8, 1879.

Attest:

Inventor.
John R. Williams, per
Thos. S. Crane, Atty.

UNITED STATES PATENT OFFICE.

JOHN R. WILLIAMS, OF NEWARK, NEW JERSEY.

IMPROVEMENT IN CIGAR-BUNCHING MACHINES.

Specification forming part of Letters Patent No. 214,015, dated April 8, 1879; application filed September 22, 1877.

*To all whom it may concern:*

Be it known that I, JOHN R. WILLIAMS, of Newark, county of Essex, State of New Jersey, have invented certain new and useful Improvements in a Cigar-Bunching Machine; and I do hereby declare that the following is a full, clear, and exact description of the same, reference being had to the annexed drawings, in which—

Figure 1:
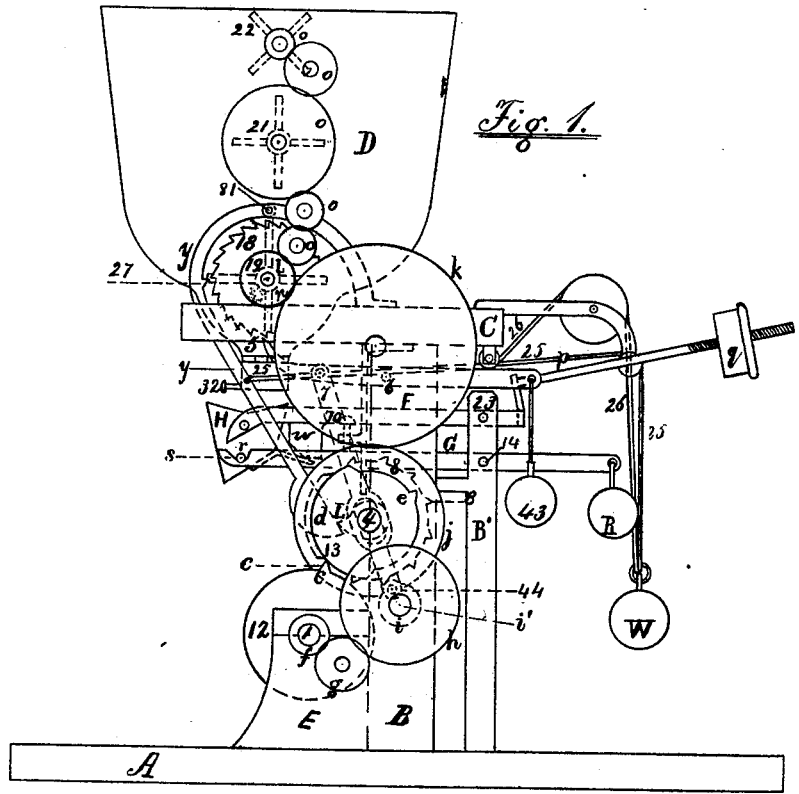
Figure 1A:
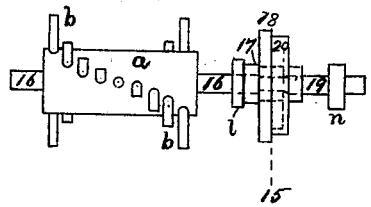
Figure 1B:
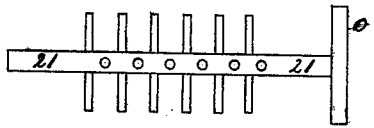
Figure 2:
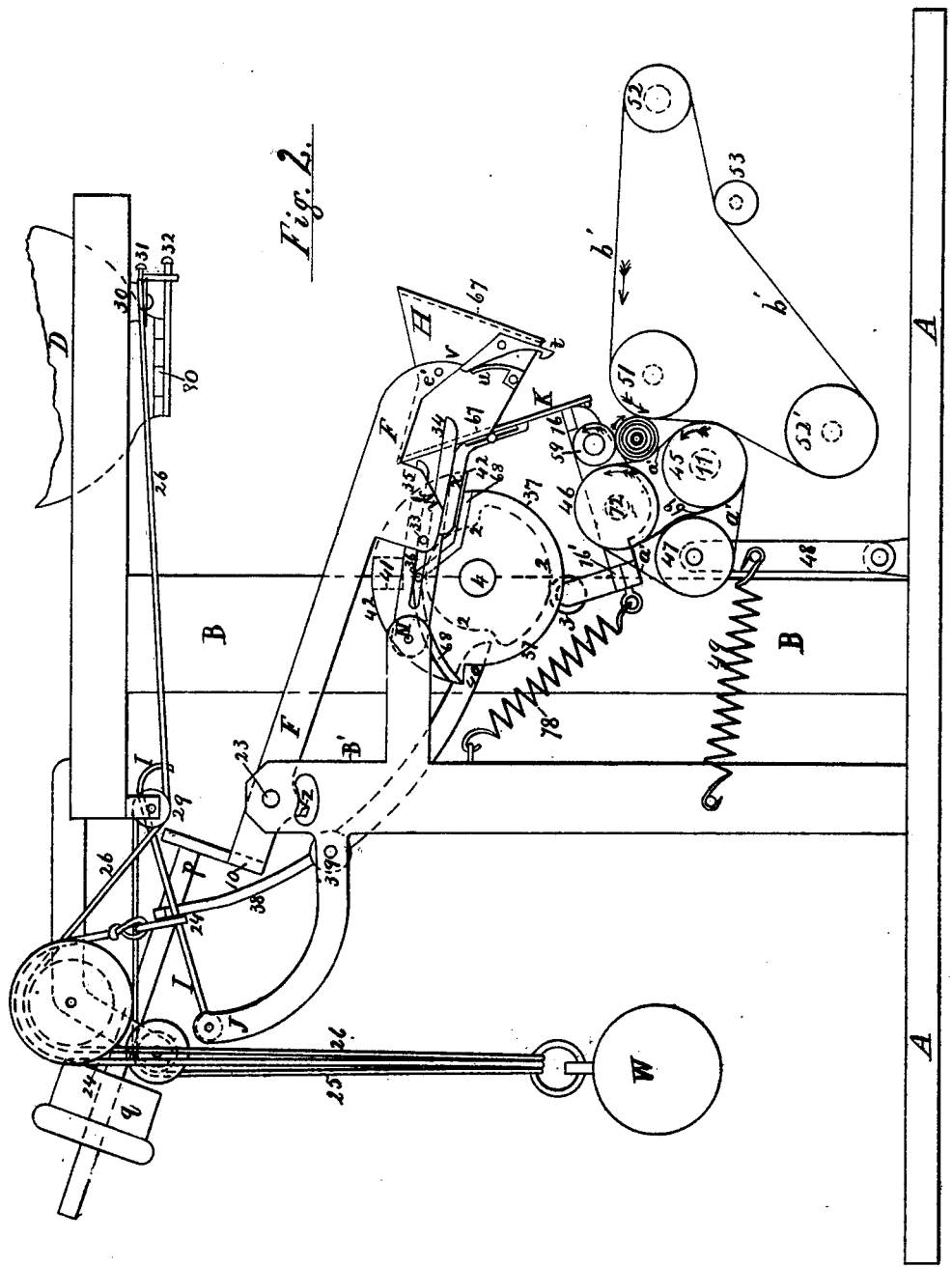
Figure 3:
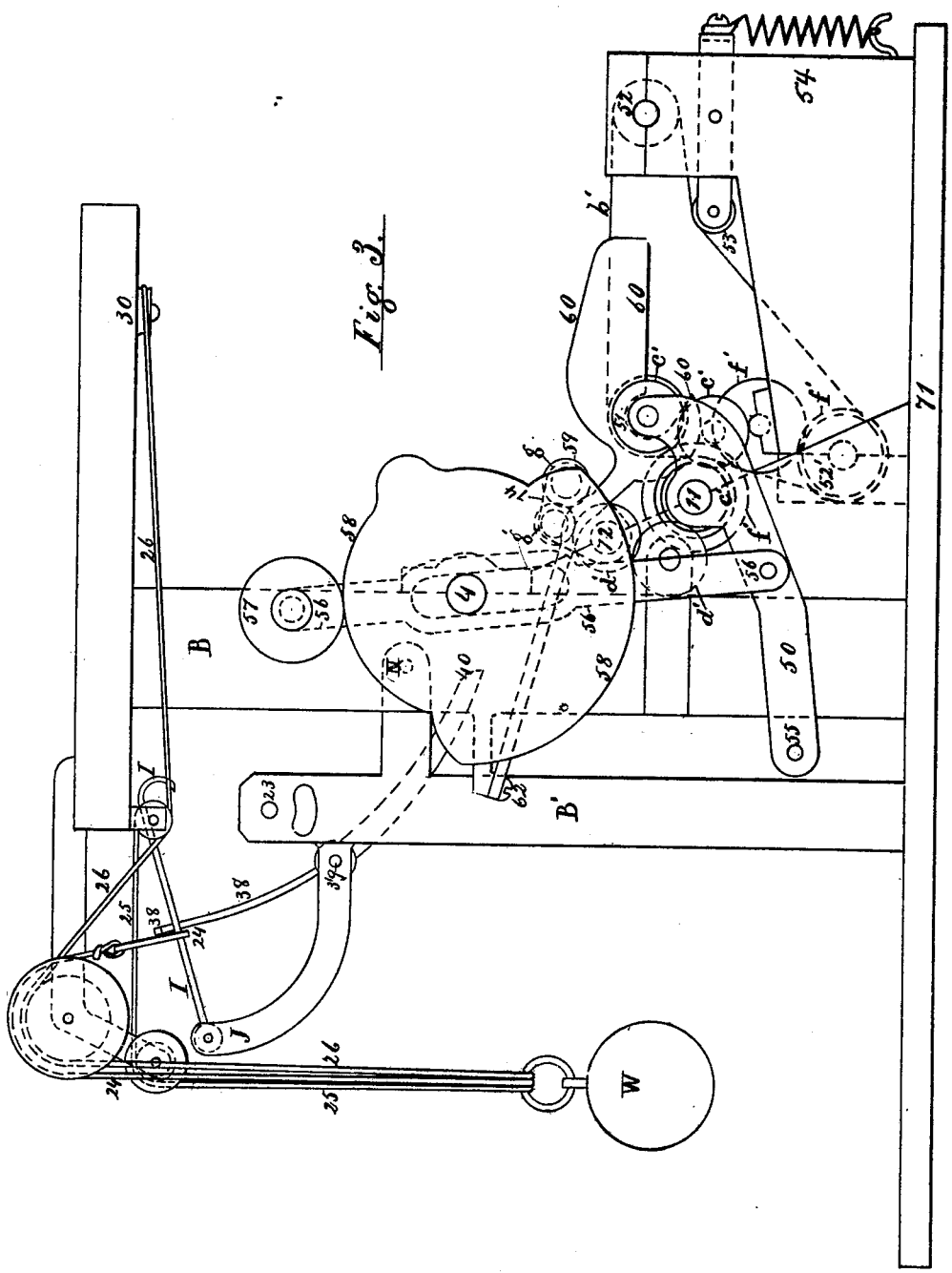
Figure 4:
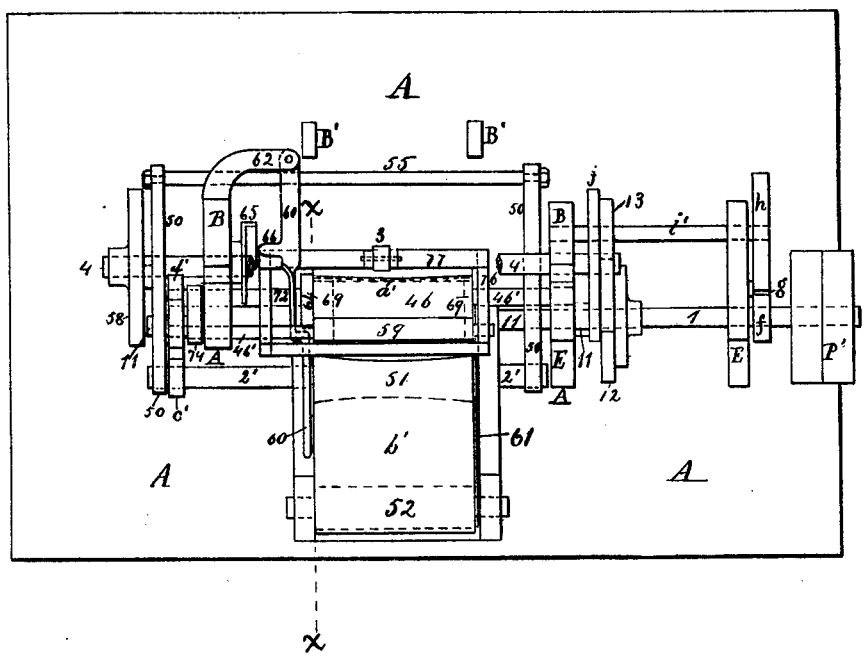

Figure 1 is a side elevation of the driving mechanism of the machine. Figs. 1ª and 1ᵇ are details of the feeding apparatus. Fig. 2 is an enlarged diagram of the bunching devices, partly in section, with the left-hand post, B, detached, together with all the parts beyond the left end of the bunching-rolls. Fig. 3 is a side elevation of the bunching mechanism; Fig. 4, a plan of the bunching mechanism, and Fig. 5 a front elevation of my improved machine.

The chief difficulty in constructing a cigar-bunching machine has been to supply the bunching-rolls with uniform fillings for the cigars; and the object of my invention is, first, to combine with the bunching apparatus an automatic weighing machine or scales, that would weigh the tobacco continuously and deliver fillings of uniform weight to the bunching-rolls; second, to construct a cigar-bunching machine that will make a bunch of any desired shape when the filling was deposited before the rolls and the binder introduced by hand; third, to connect the two machines so that the weighing devices shall operate in conjunction with the bunching devices automatically.

I will first describe the general arrangement of the mechanism for operating the combined machine, as shown in Figs 1 and 2.

A is the platform of the machine, on which two posts, B, support the cam-shaft 4. They also carry a plate, C, to which is secured the hopper D, furnished with two or three stirrers for properly stirring and mixing the contained materials, and at the same time act as feeders. A driving-shaft, 1, is also carried on platform A, being supported on standards E at one side of the platform, one of the standards being immediately in front of the right-hand post B. The posts B are placed far enough apart to receive between them the bunching mechanism, and the plate C has an aperture near its front edge, over which the hopper D is secured, and through which it discharges its contents into the scale-pan H. This scale-pan is pivoted to the forward extremities of two beams, F, and rises to the base of the hopper to receive its charge, which it deposits, when filled, upon an apron, $b'$, arranged to carry the fillings within a cavity formed by several bunching-rolls geared together by connections to shaft 11.

The fillings in this cavity formed by the rolls are rolled to the form of the proposed bunch, one of the rolls, 59, being depressed over the cavity automatically to bring a pressure on its contents, and then lifted to permit the introduction of a binder by the hand of the operator. The bunch is then further rolled in the cavity, and may be removed complete from the rolls during the lifting of roll 59 for another charge.

The scale-pan H and its contents are balanced by an adjustable counterpoise, $q$, and the scale-beam has applied to it, near its fulcrum, a detent or pointer, $z$. (Shown in Fig. 2.) The said counterpoise $q$ sustains a weight, W, suspended by cords or chains, the function of which weight, when it falls, is to close the doors of the hopper D at the same time the movements of the stirring and feeding mechanism are arrested. When this pause takes place the tobacco filling is discharged into the scale-pan H. This is effected by a cord, 25, attached to the weight W and carried to a pawl, $y$, which engages with the wheel 18, controlling the clutch, regulating in part the feeding of the tobacco.

The doors of the hopper are closed by the cord 26.

Figure 5:
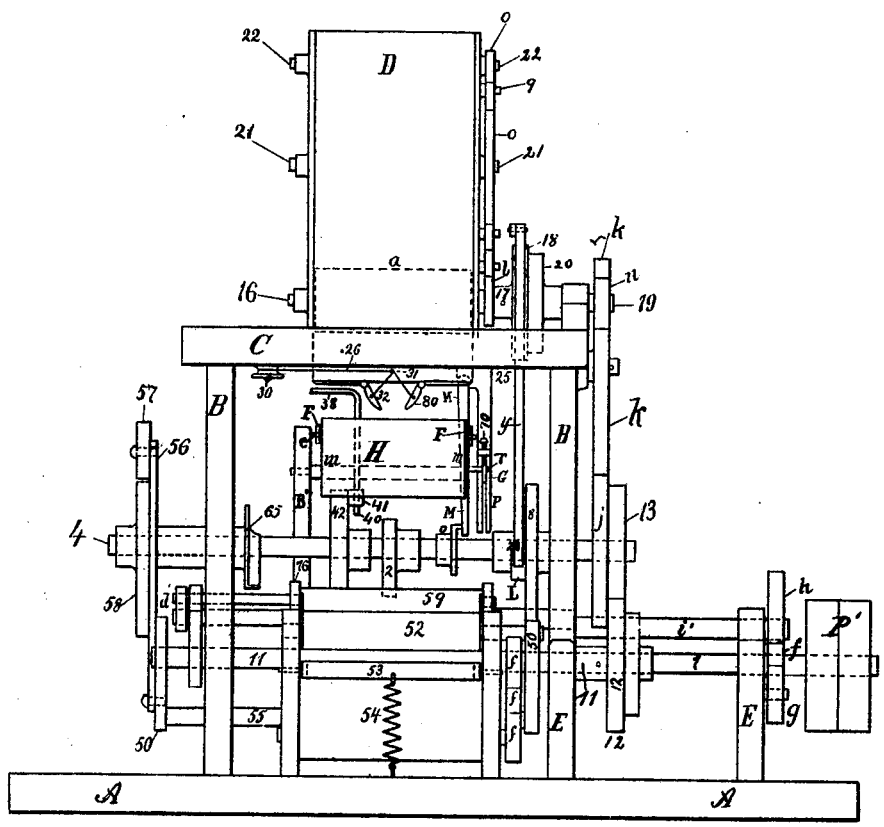

The cam-shaft 4 is supported by its bearings just above the bunching mechanism, as shown in Fig. 5, and is provided with cams 13, 8, L, O, 2, 42, 65, and 58, which control the feed prior to the descent of the scale-pan, the setting of the hook I in detent $z$ to sustain the weight W, the closing of the scale-pan door K at the proper time, and the various movements of the bunching-rolls, so that they stop and start intermittently, and open and close for rolling the filling into the desired form.

I do not claim under this application weighing devices, as these features form the subject of a separate application. This application is confined to means for bunching cigars.

Some of these operations are performed by levers; but the cams 13 and 8 (see Figs. 4 and 5) act upon clutch-wheels 12 and 18, attached, respectively, to the shaft 11 and to a feed-shaft, 16.

Shaft 1, Fig. 5, drives the entire machine by power supplied from any convenient source; but its continuous motion is shared only by the cam-shaft 4 and feed-shaft 19, the feed and bunching mechanisms acting intermittently by the impulses conveyed from shaft 4 to their appropriate clutch-wheels 12 and 18. Shaft 1 extends only from the driving-pulley P'' to the clutch-wheel 12, the motion required for shaft 4 being transmitted through a counter-shaft, $i''$. Gear $f$, Fig. 1, on shaft 1, near the outer standard E, transmits the motion, through an idle gear, $g$, secured to the standard, to gear $h$ on the counter-shaft, and the pinion $i$ on the counter-shaft near post B conveys the motion to gear $j$ on the cam-shaft 4, which thus runs at a much lower rate than shaft 1, its rate being adjusted to secure the desired speed in all the automatic movements of the machine.

Shaft 11, Figs. 4 and 5, driven, as just stated, by the clutch-wheel 12, extends across the machine between the posts B B and carries one of the bunching-rolls. The shaft 11 also transmits motion to the other bunching-rolls and to belts by gearing provided for that purpose.

To explain the operation of cams 13 and 8 upon their respective clutches, I have, in Fig. $1^a$, shown the arrangement of clutch-wheels 18 and 20 upon lower stirring or feeding shaft, 16, of the hopper D, which carries a roll, $a$, with pins $b$ projecting from its surface irregularly.

A shaft, 19, receives continuous motion from shaft 4 through gears $j$, $h$, and $n$, and terminates at the face of wheel 18 on line 15, entering a short distance into a hub, 17, secured to shaft 16 and projecting over the end of the latter.

The ratchet-wheel 18 rides loosely upon the hub 17, secured to shaft 16.

Shaft 19 has a hollow shell, 20, keyed to it, and friction-dogs are fitted between the hub 17, attached to shaft 16, and the shell 20 in such manner that the shaft 19 drives the shaft 16 until the ratchet-wheel is checked by a pawl, when the dogs loose their gripe on the shell, and all the parts attached to shaft 16 come to rest—viz., the shaft, hub 17, dogs attached to the hub, and wheel 18.

The pawl being removed, springs on hub 17 bring the dogs again into action, and the motion is instantly renewed.

From the above description it will be seen that the action of the clutch is very easily controlled by any obstacle opposed to the wheel 18, which may have only one tooth in its periphery if the motion is to be arrested only once in a revolution. Thus, clutch-wheel 12, Fig. 1, controlling the bunching mechanism, has but one tooth, $c$, on its rim, and cam 13 on shaft 4 is so shaped as to obstruct the tooth $c$, and thus arrest the bunching-rolls at the time the scale-pan H is dropping its charge on the apron $b'$ after the removal of a finished bunch.

To effect this object the cam 13 is formed with a portion of its rim raised concentrically, and it is also provided with a toe, $e$, which stops the clutch a short time while the binder is introduced into the rolls.

From gear $l$ on shaft 16 the intermittent motion is carried to the other stirring or feeding shafts, 21 and 22, by gears $o$ $o$ $o$ $o$ $o$.

Shaft 21 is shown in detail in Fig. $1^b$, to exhibit the arrangement of the pins projecting from the shaft.

Shaft 22 is similarly constructed, and is designed, like shaft 21, to prevent the material from settling into a fixed mass while being fed from the hopper.

The ends of the shafts are supported in bearings outside of the hopper, and the gears $o$ $o$ $o$ $o$ $o$ are part of them secured to the feeding-shafts and part carried on studs 9, situated between the same on the outside of the hopper.

The teeth are omitted from the gears in the drawings because of their smallness.

Having described the driving mechanism, I will now explain the operation of the automatic scale.

The scale-pan H is made, for convenience, with inclined sides 54 and vertical ends, Figs. 2 and 5. Near the top of each of these ends is inserted a supporting-pin, $e'$, and about an inch below one of these pins is secured another pin, $r$.

Two scale-beams, F, are pivoted upon two standards, B', behind posts B, and, extending forward between the posts beneath the hopper, support the pan H by the pins $e'$. These beams are united by a tie-bar, 10, beyond the rear fulcrum, 23, on standard B', from which extends still farther to the rear a balance-rod, $p$, carrying a weight, $q$, by the position of which the weights of the charges are graduated.

The beams F extend forward somewhat beyond the pins $e'$, and are formed with downwardly-projecting points $v$.

A lever, G, Fig. 1, is secured to the standard B' by a pin below the fulcrum 23, and extends parallel with the beam along the side of the scale-pan, below the pin $r$. It also projects behind the standard, and carries a weight, R, which keeps its front end pressed upward against pin $r$. A notch is provided on the upper side of this lever to fit the pin $r$, so that when the pin is in the notch the scale-pan is prevented from swinging or tipping, as it could readily do while suspended freely on pins-$e'$. Any such movement would prevent the operation of the catches $t$, Fig. 2, which are provided one on each of the ends m m, for holding the door K closed while the pan is carrying its charge.

Springs u keep the catches fast during the descent of the scale-pan H with its charge; but in its lowest position the points v of beams F press on the catches t and release the door to discharge its load.

In the upward movements of the scale-pan the door is closed by an incline, W', attached to F, and pressing on a bar, x, secured to the rear of the door K.

When the scale, in its rise, reaches the position shown in Fig. 1, the lever G is stopped by a set-screw, 70, and the scale-pan is carried to its highest position by the weight q, being then free from all restraint and ready to receive the charge registered by the position of q on the rod p.

A hooked lever, I, Fig. 2, is hinged on an arm, J, behind standard B', and raised, when free, by the cord and hook 24, attached to the weight W, but serving, when hooked on the detent z, to support the weight and slack the other cords, 25 and 26, attached to W.

Cord 25 is seen in Fig. 1 carried to a weighted pawl, y, hinged at a point, 81, over the ratchet-wheel 18, and furnished with a tooth, 27, that engages the teeth of wheel 18 when the cord 25 is tight, but when the cord is slack is kept clear of wheel 18 by the action of the weight d, secured on pawl y.

The descent of the scale a short distance moves detent z, releases hook I, and allows weight W to fall. The cord 25 then checking the motion of wheel 18 stops the feed, the cord 26, Fig. 2, at the same time closing the doors 80 of the hopper by passing over pulleys 29 and 30 to guide-pin 31, where it divides into two cords, which are attached to the doors 80 by pins 32.

To effect the opening of the door K upon the descent of the scale-pan, a forked arm is provided, into the end of which a pin, 33, Fig. 2, attached to one of the beams F, enters when the scale-pan first drops. This arm is hinged upon B' by pin N, and has its lower prong, 34, longer than the upper one, 35, the pin 33 penetrating the slot between the two prongs, and being carried downward when the arm is depressed by a cam, 42, having a groove, 68, traversing its face and embracing a guide-pin, 36, projecting sidewise from the arm. This groove is so proportioned that the arm and scale-pan are carried downward and upward in about one-half a revolution of the cam-shaft 4, the pin 36 resting during the remaining time on the concentric surface 37 of the cam.

In Figs. 2 and 5 are shown the arrangements adopted to secure the lifting of the weight W automatically when the scale-pan H has reached its highest position, and it is desired to have the hook I engage into the detent z before the scale-pan receives its charge.

A lever is hinged just below pin 23, upon the side of post B', at 39, and one arm, 38, is extended above the middle of hook I, and bent so as to reach over the same. The other arm, 40, rests near cam 42 on shaft 4, which carries a toe, 41, Fig. 5, so adjusted that it lifts the arm resting near it, and depresses the other arm, 38, carrying hook I downward over detent z.

The rising of scale-pan H causes the detent to engage the hook while thus held by toe 41, the further motion of which, by releasing the arm 40, leaves the hook I at liberty to act as described when the pan again drops.

The depression of hook I by the arm 38 acts upon the link 24, embracing the hook and cord attached, and raises weight W, to fall again at the proper time, for the purposes specified above. This sets the entire weighing apparatus to receive a charge.

If the scale-pan H should tremble or oscillate on completing its upward movement, the hook I might not catch upon detent z; and to secure a steady motion of the scale at that time I provide a friction-lever, M, Fig. 5, hinged below plate C, and pressed at the proper time against one of the beams F by a cam, O, on shaft 4. A guide, P, is also provided to steady the lever G in its motion.

It will be remembered that the descent of the scale-pan, by releasing weight W, stops the feeding-shafts in the hopper, and closes the doors 80 of the hopper D. The falling of this weight also presses the weighted pawl y into the teeth of wheel 18, and this wheel and the feed would, therefore, unless checked, run continuously until the scale-pan drops with its full charge.

Were the charge thrown into the scale-pan by a continuous feed it would be impossible to secure exact weights, as in weighing or filling a scale by hand it is found necessary to stop the filling operation frequently, to determine when the right amount has been supplied. The feed is therefore placed under the control of driving mechanism, which acts entirely independently of the scale, being governed by a cam, 8, on shaft 4, Fig. 1, which has a definite rate of motion imparted to it by the driving power, and which, by impulses imparted to a pawl, 5, determines the amount of time the feed-shafts shall revolve to charge the scale-pan H. This pawl 5 is pivoted below plate C by a pin, 6, and has a weight, 43, to keep it pressed into the teeth on wheel 18. A long link is secured by pin 7 to pawl 5, and reaches down to shaft 4, which it embraces by a slot formed in the link, and at its lower end it is provided with a roller, 44, which presses against the lower side of a circular toothed cam, 8. The weight 43 keeps the pawl 5 against wheel 18 and stops the feed, except when the projections on cam 8 depress the link by their contact with the roller 44 and set the feed in motion. The periphery of the cam is constructed to do this several times, first causing the greater part of the desired charge to be fed into the scale-pan, then adding a little at a time, by an intermittent motion, until the exact weight is secured. When that occurs the scale-pan drops, and the other pawl, y, arrests the feed instantly. The scale thus weighs and delivers one charge for each revolution of shaft 4 and its cams.

Having thus shown how my machine operates, I will now describe its operation, and also the construction and operation of my bunching devices.

The bunching-rolls are about the length of the proposed bunch, and are secured on shafts carried by bearings at each end, the ones supporting the feeding-apron being held in two frames located on the bed below the scale-pan H, and the forming-rolls being supported chiefly upon hangers swinging on a shaft which passes across the bed just before the posts B, and is held by bearings secured thereto. For convenience these bearings are inclined, as shown in Fig. 3, from a point, 71, on the bed backward and upward to the front of posts B near shaft 4.

A shaft, 11, Figs. 2 and 3, just below the one last named, is arranged in a line with shaft 1, and is driven by clutch 12, to which it is connected in the manner described for shafts 16 and 19 above.

One of the bunching-rolls, 45, is secured on shaft 11, and another roll, 46, to the shaft 72 in the inclined bearings, and a belt, $a'$, which aids in forming the bunch, runs over these two rolls, and also over a tightening-roll, 47, hung in a frame, 48, which is tightened when needful by a spring, 49.

The hangers 50 swing on shaft 11 and carry a third bunching-roll, 51, at their forward extremities just before rolls 45 and 46, while their rear ends are tied together by a rod, 55.

A link, 56, secured to one of the hangers, is provided with a roller, 57, which rests upon a cam, 58, secured to the left-hand end of shaft 4, and the hangers thus operate roll 51 in the manner before described.

The feeding belt or apron $b'$ travels over two carrying-rolls, 52 and 52', and over roll 51, by means of which any material deposited upon the belt $b'$ is carried into the space between the bunching-rolls 45, 46, and 51. The belt is tightened by roll 53 and spring 54, arranged at one end of the frames located between the posts B and below the scales to carry the rolls 52 and 52'.

By the action of cam 58 the roll 51 is held in the position shown while forming the bunch, and is depressed to introduce the binder by the fingers of the operator, also, afterward to permit the finished bunch to be readily removed and the new charge to be carried into the space between the three rolls 45, 46, and 51.

To form the bunch perfectly and put on the binder tightly a second movable roll, 59, is provided, hung in hangers 76 on the shaft of roll 46, and moved up and down, as described, by a cam, 2, on shaft 4, which acts on a roll, 3, placed on a piece, 77, connecting the rear of the hangers 76 beneath shaft 4. A spring, 78, keeps the roll 3 firmly against the cam.

By this cam and spring the roll 59 is moved up and down, as desired, over the cavity in which the filler is formed, and the required pressure produced upon the filling therein.

Roll 51 is hollowed to the curve required in the proposed bunch, and the belt or apron running over it is pressed into the concavity of the roll by the material deposited on the apron from the scale-pan. Two narrow belts, 69, are also shown in Fig. 4 underneath the apron on roll 46, one at each end, and run thence around roll 45, and the taper of the bunch at the head and tuck can be materially altered by the width allowed to them. (See also Fig. 2.)

The need for these belts would be greatly diminished if the flat belt $b'$ could be made to conform to the contour of a hollowed-out roll like 51; but the tension required to keep the edges of the belt tight also prevents it from conforming fully to the concavity of the roll.

The bunch, and especially the filler, although pressed into the cavity between rolls 45, 46, and 51 by roll 59, would not perfectly assume the described shape if the distribution of the tobacco between the rolls 45, 46, and 51 depended merely upon the yielding of the belt $b'$ as it passes over the hollowed roll 51. The two belts 69 are, therefore, great aids in preventing the filler from spreading out toward the ends of the rolls, as, indeed, any obstacle under the belt $a'$ would be.

In place of the belts 69, I have used stationary formers of metal secured to the frame under the belt $a'$ at the points where the ends of the bunch come in contact with roll 45, and find that they possess certain advantages over the belts 69, as they can be so applied as to be adjusted in and out a little under the belt, which is thus compelled to resume the desired profile in passing over them. These facts show that the rolls 45, 46, and 51 serve to form the filler and bunch into shape, the apron $a'$ preventing the loose tobacco from working through the rolls, and the apron $b'$ serving the same purpose, as well as to carry the filling dropped from the scale-pan H.

The arrows on the rolls and belts show the direction of their respective motions.

In Fig. 3 is shown the gearing needed to drive the rolls just described, No. 11 being the driving-shaft. Gears $f' f' f'$ serve to drive roll 52', and $c' c' c'$ roll 51. $d' d'$ drive roll 46, from which motion is carried to roll 59 by gears $g' g'$.

A triangular link, 74, fitted to the shafts of rolls 46 and 59, carries one of the gears $d'$. One of the gears $c'$ is carried by a stud on hangers 50, and one of gears $f'$ is placed on a stud on the frame supporting roll 52'. The teeth are omitted from the gears in the drawings to avoid crowding the lines.

Two cheek-pieces, 60 and 61, are arranged at the sides of the apron $b'$ to guide the fillings properly into the bunching-rolls, the one at the right being shown stationary, while cheek 60 is hinged to standard B' by pin 62 in Fig.

3, and extends between the shafts of rolls 46 and 59 to roll 51, the end of which it covers, as well as the whole left side of the apron $b'$.

In the plan, Fig. 4, the course of this piece is plainly shown, especially a bend at the end 63 of roll 46, where the cheek-piece is conformed to a disk or flange, 64, secured to the end of roll 46, for the purpose of twisting the binder properly when its corner is first inserted under the filler. To show the necessity of this disk and adjustable cheek-piece 60, I will describe the formation of a single bunch by the mechanism described.

The charge is dropped from the scale-pan upon the apron $b'$ between the cheek-pieces, situated as shown in Fig. 4. The apron $b'$ immediately starts forward, carrying the filler into the cavity between the rolls 45, 46, and 51, the roll 59 being raised by its cam 2 to permit the introduction of the tobacco, and then pressed down upon the same. The revolution of these four rolls being performed in the same direction rolls the filler and presses it into the shape prescribed by the yielding apron $b'$ over the concave roll, and distributing it lengthwise of the rolls into the form partly controlled by the sub-belts 69. This being done the rolls all stop, and 51 is dropped down about half an inch to permit the fingers to push the binder under the head of the bunch, the cheek 60 being at the same time moved away from flange 64 and the end of roll 51 to permit the starting of the binder upon the head of the bunch. When the rolls again revolve the roll 51 is raised to its former place, and the disk 64, being larger in diameter than the roll 46, to which it is attached, throws the end of binder upward against roll 59, and thenceforth it is twisted around as if held between the thumb and finger of the hand.

To move cheek 60 away from the flange 64, and bring it up again while the next filler is being shaped, I provide a cam, 65, (shown in Figs. 4 and 5,) on shaft 4, acting on a projection, 66, on cheek 60, which is kept against the cam by a spring. (Not shown in the drawings.)

Although not shown, a spring is also attached to the bottom of scale-pan H, and carried to its fulcrum 23 to draw the bottom of the scale-pan H toward incline W, Fig. 1, and close the door of the scale-pan when in its upper position.

What I claim as my invention is—

1. The cigar-bunching apparatus consisting of bunching-rolls carrying the apron $a'$, operating in combination with a feeding-roll running over a hollowed or shaping roll and a pressure-roll, these shaping and pressure rolls being automatically raised and lowered, as required, to admit the filler and remove the finished bunch, as set forth.

2. A cheek-piece, 60, automatically moved to and from one or both ends of the bunching-rolls, for the purpose specified.

3. A disk, 64, on the end of one of a set of bunching-rolls for twisting the binder when the same is inserted into the bunching-rolls, substantially as herein described.

4. A belt or belts, 69, applied to the bunching-rolls, in combination with an apron for distributing the fillings into the required shape for the cigar-bunch, as herein described and set forth.

5. The combination, in a cigar-bunching machine, of a scale or device to weigh the cigar-fillings, an automatic feeding mechanism for delivering the fillings into the scale, and an automatic device for discharging the fillings from the scale into bunching mechanism, substantially as herein described.

JOHN R. WILLIAMS.

Attest:
HENRY HAWORTH,
THOS. S. CRANE.